US007181439B1

(12) United States Patent
Lent et al.

(10) Patent No.: US 7,181,439 B1
(45) Date of Patent: Feb. 20, 2007

(54) SYSTEM AND METHOD FOR TRANSPARENTLY ACCESSING A VIRTUAL DISK USING A FILE-BASED PROTOCOL

(75) Inventors: Arthur F. Lent, Cambridge, MA (US); Brian Pawlowski, Palo Alto, CA (US); Vijayan Rajan, Sunnyvale, CA (US); Jeffrey S. Kimmel, Chapel Hill, NC (US); Mohan Srinivasan, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 453 days.

(21) Appl. No.: 10/423,600

(22) Filed: Apr. 25, 2003

(51) Int. Cl.
 *G06F 17/30* (2006.01)
 *G06F 7/00* (2006.01)
(52) U.S. Cl. .......................................... 707/2; 707/10
(58) Field of Classification Search .......... 707/1–104.1
 See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,029,175 A * | 2/2000 | Chow et al. | 707/104.1 |
| 6,038,570 A | 3/2000 | Hitz et al. | |
| 6,065,037 A | 5/2000 | Hitz et al. | |
| 6,088,702 A * | 7/2000 | Plantz et al. | 707/103 R |
| 6,138,126 A | 10/2000 | Hitz et al. | |
| 6,289,356 B1 | 9/2001 | Hitz et al. | |
| 6,343,297 B1 * | 1/2002 | D'Anjou et al. | 707/104.1 |
| 6,425,035 B2 | 7/2002 | Hoese et al. | |
| 6,463,552 B1 * | 10/2002 | Jibbe | 714/33 |
| 2001/0052108 A1 * | 12/2001 | Bowman-Amuah | 717/1 |
| 2002/0083120 A1 * | 6/2002 | Soltis | 709/200 |
| 2002/0091702 A1 * | 7/2002 | Mullins | 707/100 |
| 2002/0112022 A1 * | 8/2002 | Kazar et al. | 709/217 |
| 2002/0116593 A1 | 8/2002 | Kazar et al. | |
| 2002/0156984 A1 * | 10/2002 | Padovano | 711/148 |

(Continued)

OTHER PUBLICATIONS

Deni Connor, "Pirus switch eases multivendor storage control", Network World, Mar. 11, 2002, pp. 1-1.*

(Continued)

*Primary Examiner*—Don Wong
*Assistant Examiner*—Linh Black
(74) *Attorney, Agent, or Firm*—Cesari and McKenna, LLP

(57) ABSTRACT

A system and method enabling transparent access to blocks, such as virtual disks, stored on a storage system using a file-based protocol. The system and method traps incoming file-based protocol open commands to check for a predetermined modification to the file name. If the system and method detects the predetermined modification, then the virtual disk associated with the file name is exported to the client issuing the open command and the client receives a response from the storage system. The client, in response to receiving the response to the open command, creates a new device instantiation for reading and writing raw data to the virtual disk.

20 Claims, 5 Drawing Sheets

U.S. PATENT DOCUMENTS

2003/0140051 A1* 7/2003 Fujiwara et al. ............ 707/100
2003/0149763 A1* 8/2003 Heitman et al. ............ 709/224
2004/0019655 A1* 1/2004 Uemura et al. ............. 709/217

OTHER PUBLICATIONS

U.S. Appl. No. 10/216,453, Vijayan Rajan et al.
U.S. Appl. No. 10/215,917, Brian Pawlowski et al.
U.S. Appl. No. 10/412,051, Vijayan Rajan et al.
David Hitz et al. TR3002 File System Design for a NFS File Server Appliance published by Network Appliance, Inc., pp. 10 pages.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, p. 126 pages.
Fielding et al. (1999) Request for Comments (RFC) 2616, HTTP/1.1, p. 143 pages.
NCI TS 332-1999 Fibre Channel Arbitrated Loop (FC-AL-2) published by the American National Standards Institute, p. 146.
ANSI X3.230-1994, Fibre Channel Physical and Signalling Interface (FC-PH), pp. 429 pages.
Misc. Reference Manual Pages ND (4P) nd-network disk driver Jul. 26, 1985, p. 1-3.
Asante EN/SC Adapter Family Installation Guide May 1994, p. 60 pages.
Asante Desktop EN/SC Adapters User's Manual Apr. 1996, p. 1-28.
Performance Without Compromise: The Virtual Storage Architecture 1997, p. 12 pages.
Anthony J. McGregor Department of Computer Science, University of Waikato Dissertation: Block-Based Distributed File Systems Jul. 1997, p. 206 pages.

* cited by examiner

SYSTEM AND METHOD FOR TRANSPARENTLY ACCESSING A VIRTUAL DISK USING A FILE-BASED PROTOCOL

FIELD OF THE INVENTION

The present invention relates to storage systems and, in particular, to accessing virtual disks on a storage system using a file-based protocol.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Some SAN arrangements utilize storage appliances that implement virtual disks (vdisks), which are encapsulated data containers stored within a file system. An example of such a storage appliance is further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the contents of which are hereby incorporated by reference. Similarly, vdisks are further described in U.S. patent application Ser. No. 10/216,453, entitled STORAGE VIRTUALIZATION BY LAYERING VIRTUAL DISK OBJECTS ON A FILE SYSTEM, by Vijayan Rajan, et al., the contents of which are hereby incorporated by reference.

In multi-protocol storage systems that utilize both block-based and file-protocols, typically the block-based protocol utilizes a high-speed transport mechanism, such as Fibre Channel (FC) or InfiniBand (IB). Conversely, file-based protocol connections often utilize, for example, the NFS protocol operating over TCP/IP. The file-based systems typically include additional network overhead due to the nature of the file-based protocols, e.g., NFS or User Datagram Protocol (UDP), involved. This additional network overhead, from, for example, file mapping and management of file semantics, significantly reduces the data throughput available over the file-based protocol network connection.

Clients typically desire the ease of use of a file-based protocol, especially the use of the file-based protocol namespace wherein the files are referenced through a conventional drive/volume/path/file name mechanism. In contrast, in a SAN or other block-based environment, data is accessed by reference to a set number of blocks spread among the disks storing the data for the data set, which imposes a greater administrative burden on a user for using SAN-based systems. However, a noted disadvantage of the use of the file-based protocols is the above-mentioned additional network overhead required for the use of such protocols. This additional network overhead makes the use of these file-based protocols impractical for certain high-performance and data-intensive transfer operations, such as database management systems (DBMS). Many users thus desire the ease of use of a file-based protocol namespace, while needing the high-speed data throughput available from a block-based protocol.

Thus, it is a object of the present invention to enable a client to transparently use a file-based protocol namespace while permitting the performance advantages of block-based protocol access to data stored on a storage system.

SUMMARY OF THE INVENTION

The disadvantages of the prior art are overcome by providing a system and method for transparently accessing blocks, such as virtual disks (vdisks), stored on a storage system using a file-based protocol. The present invention enables transparent access to a vdisk via a file-based protocol namespace. Thus, applications and users of clients served by the storage system may utilize the namespace available from the file-based protocol, while benefiting from the high-speed data connection provided by an underlying transport media, such as Fibre Channel, connected to the vdisk. The system and method enable an application executing on a client of the storage system to issue an Open command to access the vdisk using a conventional file-based protocol, such as the NFS protocol. The application may invoke the use of a transparent access process executing on the storage system by prepending a predetermined and special prefix to the filename in the Open command. A NFS proxy layer of a storage operating system, executing on the storage system, checks the filename sent in the filename field of the Open command. If the filename does not include the special prefix, then the storage operating system processes the request using the conventional file-based protocol.

However, if the file name includes the predetermined and special prefix, then the NFS proxy layer maps the vdisk associated with the file to be opened to the client that issued the Open command. A logical unit number (lun) associated with this vdisk is also mapped to the client by the NFS proxy layer. The NFS proxy layer also, via a remote procedure call (RPC) or similar application-to-application communication method, communicates with a novel mount daemon executing on the client. The mount daemon communicates to the storage system a set of major and minor device numbers to be associated with a newly created character device instance. A character device is a block-level interface that permits an arbitrary number of bytes to be written to a device. Typically, the number of bytes written is a multiple of the size of the data blocks on the storage device. Using the returned major/minor numbers, the NFS proxy layer generates a response to the Open command and returns that response to the client. The client, upon receiving the response, generates a new instance of a character device using the major/minor device numbers. The client then returns a file descriptor to the issuing application.

Thus, to the issuing application, and users thereof, the file has been opened using conventional NFS or other file-based protocol commands and its associated namespace. However, the NFS proxy layer, in conjunction with the novel mount daemon has generated a new character device on the client that enables the client to read and write raw data over the Fibre Channel or other block-based network infrastructure. Thus, a client experiences the ease of use of the file-based namespace, while benefiting from the performance of the block-based network infrastructure.

BRIEF DESCRIPTION OF THE DRAWINGS

The above and further advantages of the invention may be better understood by referring to the following description in conjunction with the accompanying drawings in which like reference numerals indicate identically or functionally similar elements of which.

DETAILED DESCRIPTION OF AN ILLUSTRATIVE EMBODIMENT

A. Multi-Protocol Storage Appliance Environment

Figure 1:
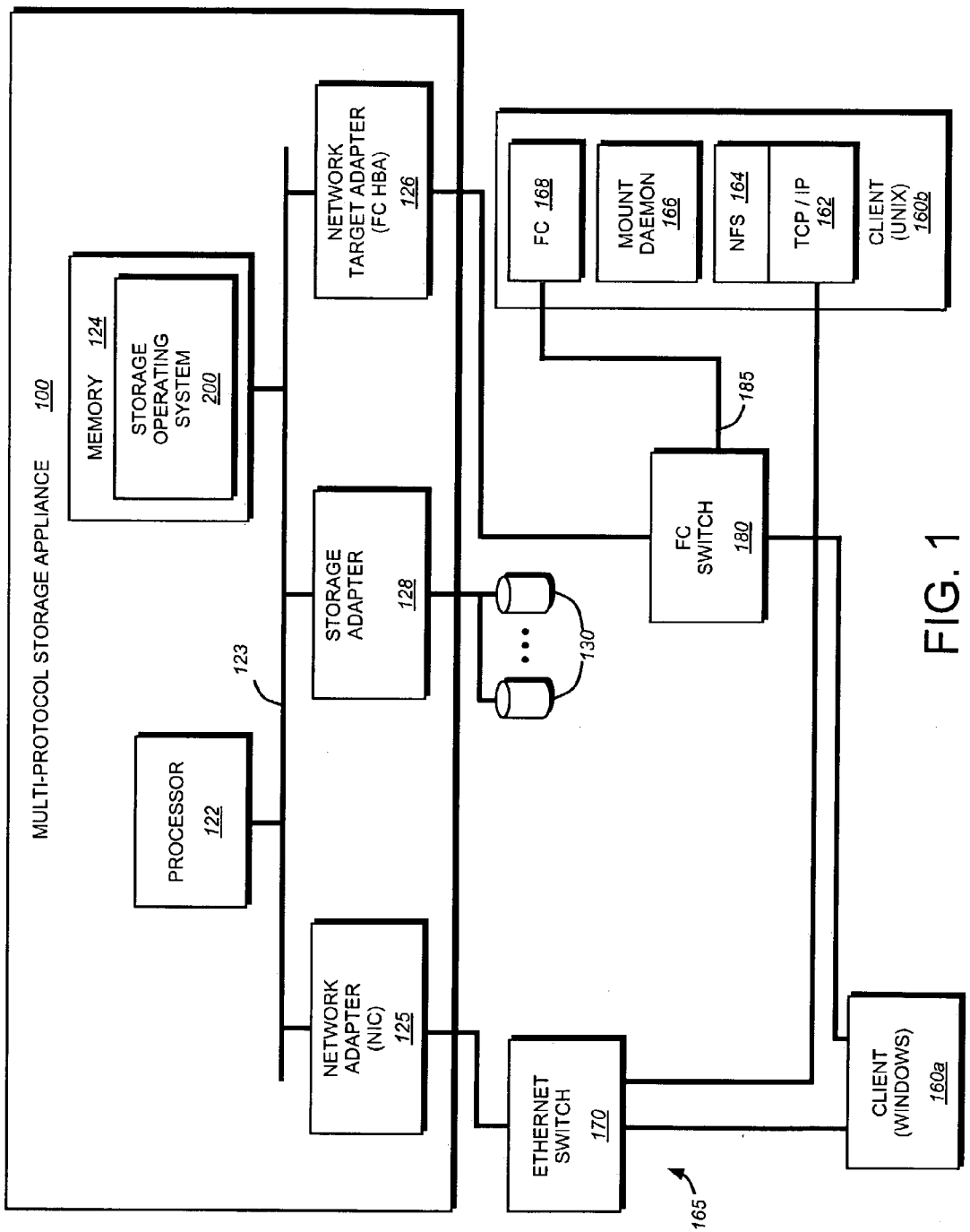
FIG. 1 is a schematic block diagram of an exemplary multi-protocol storage appliance and network environment in accordance with an embodiment of the invention.

FIG. 1 is a schematic block diagram of a multi-protocol storage system 100 configured to provide storage service relating to the organization of information on storage devices, such as disks 130. The storage system 100 is illustratively embodied as a storage appliance comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory implementations, including various computer readable media, may be used for storing and executing program instructions pertaining to the inventive system and method described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol. On the other hand, a client 160b running the UNIX operating system may communicate with the multi-protocol appliance using the Network File System (NFS) protocol 164 over TCP/IP 162. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fibre channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is an input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

In accordance with an illustrative embodiment of the present invention, a client 160b includes various software layers or modules executing thereon. For example, the client 160b may be executing a Network File System (NFS) layer 164 that implements the NFS protocol and cooperates with a TCP/IP layer 162 to enable the client to access files stored on the storage appliance using the NFS protocol. The client 160b may also include a Fibre Channel (FC) driver 168 for communicating with the storage appliance utilizing the Fibre Channel protocol. A client utilizing the teachings of the present invention also executes, in an illustrative embodiment, a novel mount daemon 166 which interacts with the storage operating system 200 of the storage system to enable transparent access to vdisks using a file-based protocol such as NFS. The mount daemon operates in conjunction with the NFS Proxy layer, described further below, to provide appropriate device addresses to the storage system. The mount daemon may be implemented as a background process, thread or may be a remotely callable library of procedures that performs the various functionality described below. It should be noted that the software layers that are shown for client 160b are exemplary only and that they may be varied without departing from the spirit and scope of the invention. Additionally, it should be noted that the NFS layer 164 is shown for exemplary purposes only. Any file-based protocol may be utilized in accordance with the teachings of the present invention, including, for example CIFS.

B. Storage Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to NAS clients. An example of a vdisk and its associated inodes is further described in U.S. patent application Ser. No. 10/216,453 entitled STORAGE VIRTUALIZATION BY LAYERING VDISKS ON A FILE SYSTEM, by Vijayan Rajan et al., the contents of which are hereby incorporated by reference.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
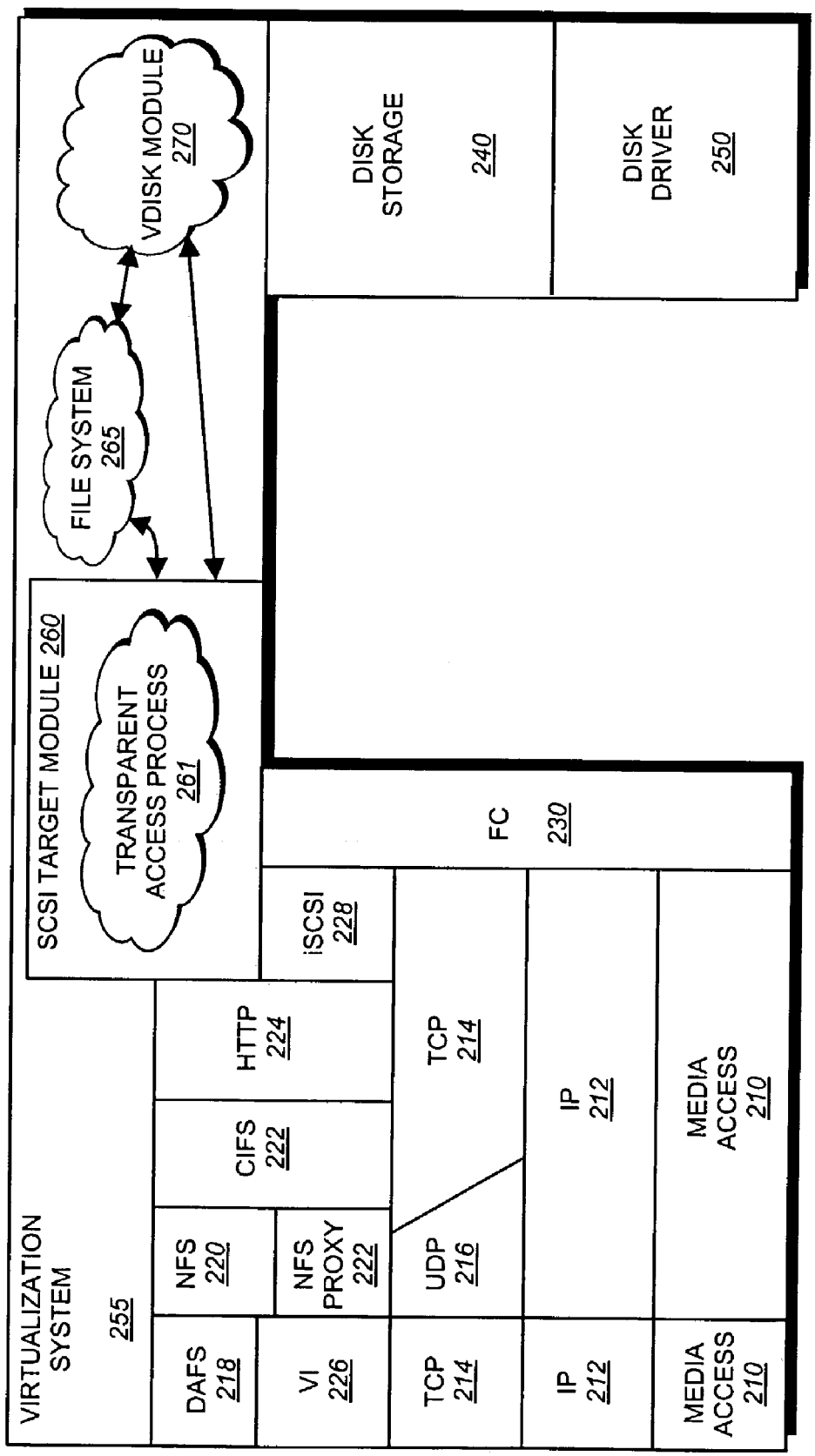
FIG. 2 is a schematic block diagram of an exemplary storage operating system for use on a storage appliance in accordance with an embodiment of the invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

The file system protocol layer also includes, in the illustrative embodiment a NFS proxy layer 222. The NFS proxy layer examines each NFS Open or look up commands issued by a client of the storage system to determine if the command is to utilize the novel transparent Open command in accordance with the teachings of the present invention. The NFS proxy layer 222 performs this function by examining the filename field of the appropriate Open command, described further below. It should be noted that an NFS proxy layer is shown for exemplary purposes only. The teachings of the present invention may be utilized with any file-based protocol including, for example CIFS or HTTP. In such alternate embodiments, an appropriate proxy layer would be implemented within the storage operating system.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (lun) commands that are converted to primitive file system operations ("primitives") and that interact with the file system 265 and the SCSI target module 260 to implement the vdisks.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the iSCSI and FC drivers 228, 230 and the file system 265 to thereby provide a translation layer of the virtualization system 255 between the SAN block (lun) space and the file system space, where luns are represented as vdisks.

In addition, the SCSI target module 260 includes one or more transparent access processes 261. The transparent access processes 261, described further below, enable clients to transparently access a vdisk by utilizing a file-based protocol. These transparent processes cooperate with the mount daemon (166 in FIG. 1) executing on the client to implement the novel system and method for transparently accessing vdisks using a file-based protocol.

The file system 265 illustratively implements the WAFL file system having an on-disk format representation that is block-based using, e.g., 4 kilobyte (kB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

C. Transparently Accessing a Vdisk Using a File-Based Protocol

Users of certain files may desire high-speed access to the files; however, the users may also desire the ease of use of utilizing a file-based protocol namespace, such as the namespace available through the NFS protocol. By implementing the teachings of the present invention, users, and application software executing on a client, may transparently access a file by issuing a file-based protocol command that utilize the protocol's namespace but that performs actual data transfers over a block-based protocol transport mechanism. By "transparently access" it is meant that the application or other process executing on the client utilizes a conventional Application Programming Interface (API) to send a file open command and that the application may use conventional input/output (I/O) commands to perform data access operations to the specified file. In accordance with an embodiment of the present invention, subsequent I/O requests are transparently directed to a newly created device instantiation that permits data to be directly written to a vdisk containing the requested file.

Figure 3:
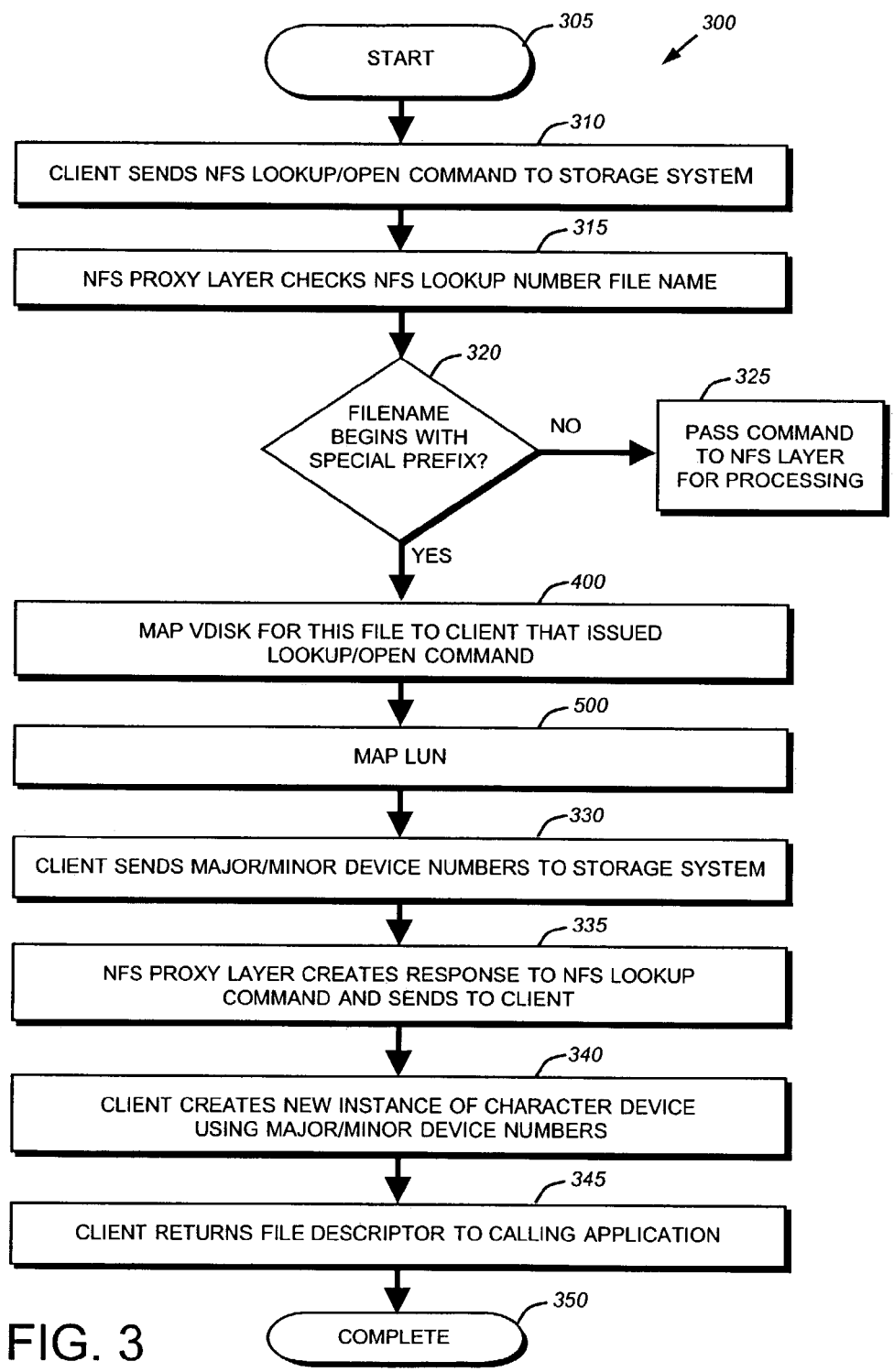
FIG. 3 is a schematic flow chart detailing the path that a command follows within a storage appliance in accordance with an embodiment of the invention.

An exemplary procedure 300 for permitting the transparent access to a vdisk using a file-based protocol in accordance with an illustrative embodiment of the invention is shown in FIG. 3. The procedure initially begins in step 305, and then proceeds to step 310 where an application executing on the client issues a NFS Lookup (i.e., an Open) command to the storage system serving the vdisk. In the illustrative example, the NFS protocol is illustrated; however, it will be understood that the teachings of the present invention may be implemented using any file-based protocol in conjunction with the teachings of the present invention. Additionally, it should be noted that the term "open command" should be taken to include the full sequence of lookup commands for each component of the full pathname. This Open command is passed through the various software layers of the storage operating system executing on the storage system until the NFS proxy layer 222 receives the command.

The NFS proxy layer then checks the filename stored in the Open command in step 315 and determines if the filename begins with a predetermined and special prefix (step 320). The special prefix is used to denote that the Open command should utilize the novel transparent access open command described herein. It should be noted that the use of a special prefix is illustrative only and that any form of modification to the file name, including, for example suffixes, prefixes, and the like, may be implemented while remaining within the spirit and scope of the present invention. Additionally, in an alternate embodiment, a user may set a certain bit in the file-based Open command to alert the storage operating system executing on the storage system that the client desires to utilize the transparent access open command. In the illustrative embodiment, the file name portion of the path to a file is preceded by a prefix (DB:). Thus if the file name was, for example "/vol0/dir/file," the modified file name containing the special prefix would be "/vol0/dir/DB:file." In an alternate embodiment, a special directory name may be inserted into the pathname. Thus, if the file name was, for example "/vol/dir/file," the modified file name containing the special directory name may be "/vol/.iscsi/dir/file." In this example, the "/.iscsi" would comprise a psuedo-directory that would alert the NFS proxy layer to use the teachings of the present invention.

The prefix identifies to the NFS proxy layer 222 that the file to be opened should be opened for transparent use as a vdisk in accordance with the teachings of the present invention. The client or user of the storage system would, in issuing its Open command, insert the appropriate prefix to alert the storage system that it desires to utilize the teachings of the present invention. Thus, a database administrator that desires to utilize the namespace of, for example, the NFS protocol, but desires the high-speed throughput of a SAN environment, may configure the database management system (DBMS) to utilize the special prefix, e.g., "DB:," for those databases that require high-speed data access available through the teachngs of the present invention.

If in step 320, the NFS proxy layer 222 determines that the file name does not begin with the predefined special prefix, the procedure then branches to step 325 where the NFS proxy layer passes the Open command to the NFS layer 220 of the storage operating system for processing. This processing will be performed in accordance with the conventional NFS protocol, i.e., without the benefit of the advantages of the present invention. However, if the file name does begin with the appropriate prefix, the procedure then maps a vdisk for the file to be opened to the client that issued the Open command in step 400. This step, described further below, ensures that if the file to be opened is not already a vdisk on the storage system, that it is converted into a vdisk using known storage operating system procedures. Next, in step 500, the lun is mapped to the client. The step of mapping the lun to the client ensures that the client has identified the specified lun associated with the file to be opened and properly recognizes it as a lun that is accessible for I/O operations.

After the lun has been mapped to the client, the client then sends a set of major/minor device numbers to the storage system in step 330. This transmission is originated by the novel mount daemon executing on the client using a conventional data transport protocol, such as TCP/IP. Major/minor device numbers uniquely identify a device operatively connected to a Unix-based operating system for I/O operations. Major and minor numbers are associated with the device files in the /dev directory that are used by the operating system to determine the actual driver and device to be accessed by a user-level level request with a special device file. Typically, each hardware controller has its own unique major number. Each device connected to a given controller then has its own unique minor number. Thus, any single device may be uniquely identified using a major/minor number combination. In alternate embodiments, the client may be executing a non-Unix-based operating system. In those embodiments, the major/minor de-vice numbers would be replaced by an operating system specific identification of a unique device on the client for reading and writing of "raw" data to a vdisk. Such a raw device, also termed a character device interface, permits an arbitrary number of bytes to be written to an arbitrary offset within the device. Typically, to achieve high performance operations, writes are conducted in multiples of the block size of the underlying storage device and are typically aligned to coincide with the blocks of the device.

After receiving the major/minor numbers, the NFS proxy layer creates, in step 335, a response to the Open command containing the major/minor numbers and sends the generated response to the client. This generated response comprises a conventional NFS response to an Open command. Upon receipt of the NFS response, the client creates a new instance of a character device using the returned major/minor device numbers in step 340. In accordance with conventional file protocol implementations, the major/minor pair is read by the client upon receipt of a file system response to an Open command. The client's operating system then creates an instantiation of a device identified by the major/minor pair. Typically, the major/minor pair is identified with the file-based protocol device that is sending the protocol packets over the network; however, the created NFS response includes a major/minor pair that identifies a character device that may be utilized to access the vdisk over the block-based protocol network paths.

Once this new instantiation has been generated, the client has created a device that is accessible by applications and that utilizes the Fibre Channel or other high-speed data connection to the vdisk associated with the specified file. The client's file protocol layer then, in step 345, returns a file descriptor to the issuing application and the sequence completes in step 350. From the application's point of view, it issued an Open command using a file-based protocol namespace and that file was successfully opened. However, the mount daemon has transparently generated a new instantiation of a character device for reading and writing raw data to the vdisk that embodies the requested file. The new character device permits the client to directly read and write data to the vdisk. From the client's perspective, it is issuing read and write requests to the already opened file, which was opened using the file-based protocol. Thus, the client can utilize the high-speed access available over the block-based transport medium while being able to reference data using a file-based protocol's namespace.

Figure 4:
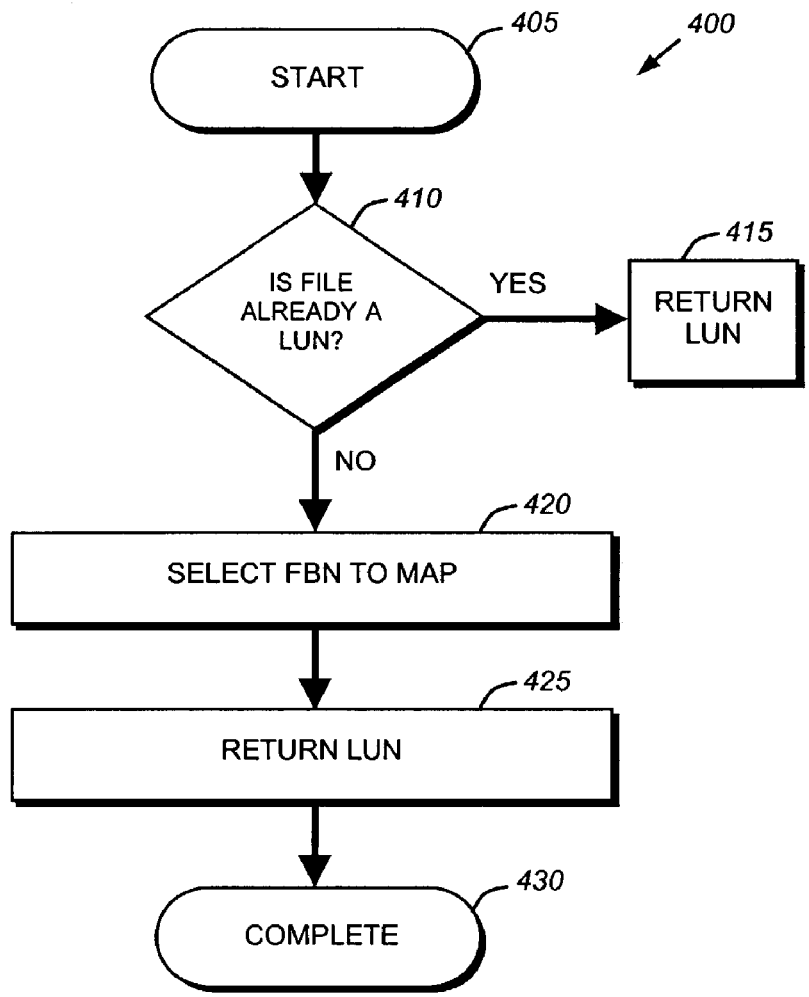
FIG. 4 is a flowchart detailing the steps performed in mapping a virtual disk for an open file to a client in accordance with an embodiment of the present invention.

FIG. 4 shows the steps of a procedure 400 for mapping a vdisk for the specified file to the client that issued the Open command. The procedure begins in step 405 and continues to step 410 where the procedure determines if the file is already a lun, i.e., a vdisk. This determination may be made by examining the type of file to determine whether it is embodied as a regular file within the file system or as a special file, i.e., a vdisk. If the file is already a lun, the procedure then branches to step 415 where it returns the lun. By returning the lun, the storage operating system of the storage system exports the lun so that it is accessible and visible to the specified client. This may be accomplished by using conventional lun masking/mapping techniques. Otherwise, the procedure converts the file to a lun in step 420. This conversion may be accomplished using storage operating system procedures for converting a file into a virtual disk that embodies the data contained within the file. One example of such a procedure is described in U.S. patent application Ser. No. 10/412,051, entitled SYSTEM AND METHOD FOR SUPPORTING FILE AND BLOCK ACCESS TO STORAGE OBJECT ON A STORAGE APPLIANCE by Vijayan Rajan et al., the contents of which are hereby incorporated by reference. After the file has been converted into a lun, the procedure returns the lun in step 425 by appropriately exporting the lun to the client and completes in step 430.

Figure 5:
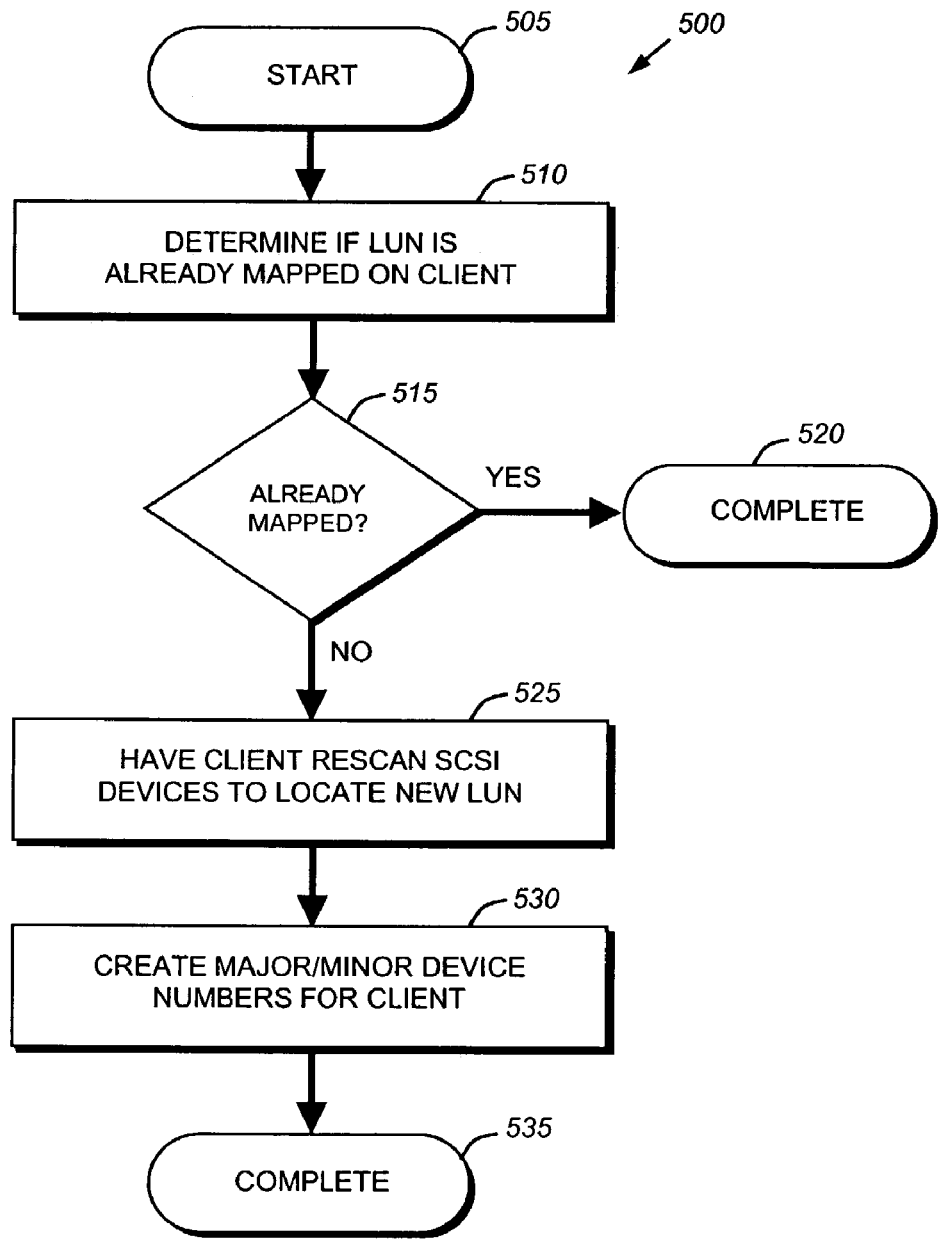
FIG. 5 is a flowchart detailing the steps of a procedure for mapping a lun to a client in accordance with an embodiment of the present invention.

FIG. 5 is a flowchart detailing the steps of a procedure 500 for mapping a lun to the client. In the illustrative embodiment, the novel mount daemon 166 performs the steps of procedure 500. However, it should be noted that other components of the client may implement this procedure in alternate embodiments. The procedure initially begins in step 505 and then proceeds to step 510 where the procedure determines if the lun is already mapped to the client. This may be determined by, for example, examining a list of devices associated with the operating system executing on the client. In decision block 515, the procedure determines if the lun has already been mapped to the client. If it has already been mapped, the procedure branches to step 520 and is then complete. Otherwise, the procedure branches to step 525, where the procedure rescans the SCSI devices associated with the client to locate the newly mapped lun. This may be accomplished by using, for example, conventional interprocess communication (IPC) or API function calls to the appropriate drivers or file system layers of the client's operating system.

Once the client has rescanned the SCSI devices to locate the new lun, the procedure then creates a major/minor device number to be associated with the lun (step 530). These major/minor device numbers, described further above, are utilized to uniquely identify the instantiation of the raw character device to be associated with the vdisk/lun. The procedure then completes in step 535.

To again summarize, the present invention is directed to a system and method for enabling a client application to issue a file-based protocol Open command and transparently access a virtual disk stored on a storage system using a block-based protocol. The client may utilize the convenient namespace of the file-based protocol, while obtaining the performance benefits of the high-speed data access path associated with the vdisk. In accordance with an illustrative embodiment of the present invention, the client executes a is novel mount daemon that interacts with a NFS, or other file-based protocol, proxy layer executing on the storage system. The transparent access is achieved by prepending a predetermined and special prefix to a filename contained in an Open command sent through the file-based protocol. The NFS proxy layer, executing within the storage operating system of the storage system, identifies that the Open command is directed to a filename that contains the predetermined prefix and initiates the system and method of the present invention. The NFS proxy layer, in conjunction with the SCSI target module of the storage operating system, ensures that the file to be opened is represented as a vdisk and is exported to the requesting client. If the file to be opened is not already a vdisk, the procedure also converts it to one using conventional file to vdisk conversion routines. The storage system then communicates with the mount daemon executing on the client. The mount daemon ensures that the exported vdisk is mapped to the client and, if it is not already, causes the client to rescan the SCSI devices connected thereto to identify the newly mounted vdisk. Thus, the present invention enables a client to open a vdisk utilizing a file-based protocol and its associated namespace but perform later data access operations using a block-based protocol data path.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Additionally, it should be noted that while this description is written with reference to the NFS protocol, any file-based protocol may be utilized in accordance with the teachings of the present invention. Accordingly this description is to be taken only by way of example and not to otherwise limit the scope of the invention. It is thus the object of the appended claims to cover all such variations and modifications as come within the true spirit and scope of the invention.

What is claimed is:

1. A method for a client of a storage system to transparently access a virtual disk on the storage system using a file-based protocol, the method comprising the steps of:
sending a file open command using the file-based protocol from the client to the storage system, the file open command including a modified file name;
checking for the modified file name at the storage system, and
in response to detecting the modified file name, performing a transparent open process that allows the client to access the virtual disk using a block-based protocol.

2. The method of claim 1 wherein the modified file name comprises a predetermined prefix to the file name.

3. The method of claim 1 wherein the modified file name comprises a predetermined suffix to the file name.

4. The method of claim 1 wherein the transparent open process further comprises the steps of:
mapping the virtual disk for a file to the client;
mapping, by the client, an exported logical unit number;
sending, by the client, a device identification to the storage system;
responding, by the storage system, to the open command issued by the client;
creating a new instance of a device using the device identification; and
returning a file descriptor to an application that issued the open command.

5. The method of claim 4 wherein the step of mapping the virtual disk for the file to the client further comprises the steps of:
determining if the file comprises the virtual disk;
converting, in response to determining that the file does not comprise the virtual disk, the file to the virtual disk; and
exporting the virtual disk to the client.

6. The method of claim 4 wherein the device identification further comprises a major number and a minor number.

7. The method of claim 4 wherein the step of exporting the virtual disk to the client further comprises the step of setting an appropriate lun mask so that the client may access the virtual disk.

8. The method of claim 4 wherein the step of mapping the exported logical unit number by the client further comprises the steps of:
determining if the logical unit number is already mapped;
rescanning, in response to determining that the logical unit number is not already mapped, a device bus to locate the logical unit number; and
creating a device identification associated with the logical unit number.

9. The method of claim 8 wherein the device bus further comprises a small computer system interface bus.

10. The method of claim 8 wherein the device identification further comprises a major number and a minor number.

11. The method of claim 1 wherein the virtual disk comprises an encapsulated data container embodied as a special file.

12. The method of claim 1 further comprising the step of transparently performing, by the client, input/output operations to the virtual disk.

13. The method of claim 12 wherein the input/output operations are directed to a character device associated with the virtual disk.

14. A method for a client of a storage system to access transparently a virtual disk on the storage system using a file-based protocol, the method comprising the steps of:
sending, by the client to the storage system, a modified file open command;
checking, by the storage system for the modified file open command;
mapping in response to detecting the modified file open command, a virtual disk for the file to the client;
mapping, by the client, an exported logical unit number;
sending, by the client, a device identification to the storage system;
responding, by the storage system, to the open command issued by the client;
creating a new instance of a device using the device identification; and
returning a file descriptor to an application that issued the open command.

15. The method of claim 14 wherein the step of mapping the exported logical unit number by the client further comprises the steps of:
determining if the logical unit number is already mapped;
rescanning, in response to determining if the logical unit number is not already mapped, a device bus to locate the logical unit number; and creating a device identification associated with the logical unit number.

16. The method of claim 15 wherein the device bus further comprises a small computer system interface bus.

17. The method of claim 15 wherein the device identification further comprises a major number and a minor number.

18. A network storage system comprising:
a storage appliance executing a storage operating system having a file-based protocol proxy layer adapted to identify incoming file open requests that contain a modified file name; and
a client operatively interconnected with the storage appliance via a file-based transport medium and a block-based transport medium, the client including a mount daemon adapted to interact with the proxy layer to enable a file to be opened using a file-based protocol command and to perform input/output operations to a virtual disk embodying the file using the block-based transport medium.

19. A network storage system comprising:
means for identifying files to be opened using a block-based protocol transport medium and a file-based protocol namespace;
means for exporting an identified file as a virtual disk to a requesting client; and
a client containing means for generating a new device instantiation associated with the exported virtual disk, wherein the new device instantiation enables the client to direct input/output operations to the virtual disk using a modified file name.

20. A computer readable media, including program instructions executing on a computer, for transparently accessing a virtual disk using a file-based protocol, the program instructions including instructions for performing the steps of:
sending, by the client to the storage system, a file open command using the file-based protocol, the file open command including a modified file name;
checking, by the storage system, for the modified file name;
performing, in response to detecting the modified file name, a transparent open process that allows the client to access the virtual disk using a block-based protocol.

* * * * *